United States Patent Office

Re. 27,599
Reissued Mar. 13, 1973

27,599

PROCESS FOR THE PRODUCTION OF A GAS CONTAINING GASEOUS HYDROCARBONS

Brian Hoyle Thompson and Binay Bhushan Majumdar, Solihull, London, England, assignors to The Gas Council, London, England No Drawing. Original No. 3,591,356, dated July 6, 1971, Ser. No. 769,461, July 22, 1968. Application for reissue Mar. 15, 1972, Ser. No. 235,051
Claims priority, application Great Britain, Aug. 15, 1967, 37,530/67
Int. Cl. C10g *13/00, 13/30*
U.S. Cl. 48—213 9 Claims

Matter enclosed in heavy brackets [ ] appears in the original patent but forms no part of this reissue specification; matter printed in italics indicates the additions made by reissue.

ABSTRACT OF THE DISCLOSURE

A process for the production of a gas containing gaseous hydrocarbons by the hydrogenation of non-distillate hydrocarbon oils. The oil is first preheated in the liquid phase, and then introduced through an atomiser into a gas recycle hydrogenator in which the oil reacts under pressure with, and is continuously entrained into circulation with, a supply of hydrogenating gas. A gas containing gaseous hydrocarbons is formed by reaction of the oil and the hydrogen, and is continuously withdrawn from the hydrogenator. The process is primarily for the hydrogenation of nondistillate oils, such as crude petroleum and particularly light crude petroleum.

This invention relates to a process for the production of a gas containing gaseous hydrocarbons, and in particular to a process for the production of a gas containing gaseous hydrocarbons by the hydrogenation of non-distillate hydrocarbon oils.

Non-distillate hydrocarbon oils (such as crude petroleum oil) have previously been hydrogenated to produce a gas containing gaseous hydrocarbons by reacting the oil with a hydrogenating gas by passing the reactants through a bed of a particulate solid material maintained in the fluidised state under suitable conditions of temperature (500° C. to 1000° C.) and pressure (above 3 atmospheres) so that substantially the whole of the hydrocarbons in the oil that undergo reaction with hydrogen are converted into gaseous hydrocarbons or into gaseous hydrocarbons and condensable aromatic hydrocarbons. Such a process can be carried out causing the particulate solid material, which is present to maintain uniform temperatures throughout the reaction zone, to recirculate within the reaction vessel by introducing the hydrogenating gas into the reaction zone from the base of the reaction vessel. The reactants themselves do not recirculate and pass directly through the reaction vessel.

Distillate hydrocarbon oils have previously been hydrogenated to produce a gas containing gaseous hydrocarbons by reacting the oil with a hydrogenating gas in apparatus known as the gas recycle hydrogenator. A gas recycle hydrogenator is apparatus comprising a reaction vessel so constructed that the reactants react with one another under pressure and are continuously entrained into circulation therein and that the product gas can be continuously withdrawn, at least one of the reactants being introduced in a manner which promotes the circulation. Our British patent specification No. 1,031,717 describes such hydrogenators and a continuous process for the vapour-phase hydrogenation of a hydrocarbon distillate oil comprising aliphatic constituents, wherein the oil vapour and a gas comprising hydrogen are continuously introduced into a thermally insulated reaction chamber so constructed as to define an endless path along which gas can circulate within the chamber, the oil vapour is reacted exothermically with hydrogen in the chamber at a temperature within the range of from 600° C. to 800° C. under a pressure of at least 5 atmospheres gauge, gaseous products of reaction are continuously withdrawn from the reaction chamber, the reactants are introduced in the form of at least one jet through orifice means into the reaction chamber to cause a substantial body of gas comprising both reactants and reaction products to circulate continuously around the said endless path, and the reactants are preheated to an extent such as to maintain a reaction temperature within the aforesaid range that is substantially uniform throughout the interior of the reaction chamber except in the vicinity of the orifice means.

It has hitherto been supposed on several grounds that such a process could not be used with a non-distillate oil. First, only distillates can be completely evaporated and mixed with hydrogen, so as to allow of pre-mixing of the reactants and their introduction into the reactor in the gaseous state. Secondly, the temperature to which nondistillate oils can be heated without risk of pyrolysis is lower than that for distillates, so that difficulty was envisaged in imparting adequate sensible heat to the reactants to maintain the reaction temperature. Thirdly, it was supposed that with such oils carbon deposition on the reactor walls and within the reaction space would be rapid enough to interfere at an early stage in operation with the recirculatory flow of the reactants and products, with consequent loss of temperature uniformity within the vessel.

We have now found that the gas recycle hydrogenator can be used in the hydrogenation of non-distillate oils when the oil is atomised into the hydrogenator, rather than being introduced by means of a jet as commonly used in such hydrogenators.

Accordingly the invention provides a process for the production of a gas containing gaseous hydrocarbons by the hydrogenation of hydrocarbon oils, which process comprises preheating the oil in the liquid phase, atomising the preheated oil into a gas recycle hydrogenator in which the oil reacts under pressure with and is continuously entrained into circulation with a supply of hydrogenating gas, whereby the oil reacts with hydrogen to form gaseous hydrocarbons, and continuously withdrawing a gas containing the gaseous hydrocarbons from the gas recycle hydrogenator.

The gas produced by the process of the invention can be used as a fuel, for example as a component of town gas or, if necessary with further enrichment, for example with light petroleum gases, as a gas that can be used to supplement natural gas supplied especially when the hydrocarbon oil is a non-distillate oil, condensate rich in aromatic hydrocarbons, and carbon black, are also produced.

The non-distillate oils may be crude petroleum or other oils having similar density and volatility characteristics; they may also originate from the treatment of coal. The preferred oils are light crude petroleums, particularly those having a density of less than 0.9 and a Conradson carbon content of less than 2 percent by weight.

The oil may be atomised by a simple conventional atomiser consisting of a central tube terminating in a nozzle for the supply of oil, surrounded by a co-axial tube terminating in a nozzle a short distance beyond the oil nozzle, for the supply of an atomising gas. The supply of oil, suitably preheated, along the central tube and of preheated atomising gas along the outer annular passage at a suitable rate and pressure result in the projection from the outermost nozzle of a stream of gas mixed with a dispersion of atomised oil at a high velocity. However, any atomiser can be used that produces a jet, consisting of oil droplets entrained in gas, of the right characteristics to induce circulation of reactants and products round the reaction vessel path. If an atomiser is used that is not of this description, circulation must be separately induced by other means, for example, by using a suitable jet or jets of hydrogenating gas which can be located near the atomiser.

The hydrogenating gas (which may be any hydrogenating gas) may conveniently be used as the atomising gas, and all, or nearly all, of that required for the conduct of the hydrogenation reactions may be supplied in this way. It is advantageous to introduce a small proportion (a few percent, e.g. 2 to 5%) of the hydrogenating gas as bubbles into the stream of oil feedstock, before it enters the oil preheaters, as this reduces the formation of deposits in the preheater tubes. For example, with a total quantity of hydrogenating gas of 200 to 400 s.c.f. per gallon of oil, 10 to 12 s.c.f. per gallon may be introduced into the stream of oil.

It is not desired to supply all the hydrogenating gas through the atomiser, that part not so supplied may be introduced by any suitable means, for example, along a passage formed by providing an outermost tube co-axial with the atomiser proper, terminating near the atomiser nozzle.

This procedure enables the difficulty about preheat to be overcome by preheating the oil, in the liquid phase, preferably to as high a temperature as is consistent with avoiding pyrolysis, separately from the hydrogenating gas. For example, the preheat temperature that is suitable for the preferred feedstock, a light crude petroleum, is 300 to 400° C., more preferably 300 to 350° C. The hydrogenating gas alone may be preheated to any desired temperature—in particular it may be heated to a temperature such that the total sensible heat of the reactants is capable, in conjunction with the exothermicity of the reactions, of sustaining the operation of the hydrogenator in a thermally self-supporting manner, notwithstanding the withdrawal of the sensible and latent heat by the products. If desired, heat may be supplied by other known means, for example, by adding air to the reactants for internal combustion.

The reaction is generally carried out at a temperature of from 650° C. to 850° C., preferably 700° C. to 800° C. The pressure is generally above 5 atmospheres and within the range 5 to 100 atmospheres, but is preferably within the range 25 to 50 atmospheres.

Carbon deposition within the reaction vessel can be limited or prevented by taking certain precautions, severally or all together. These precautions include: the avoidance of excessively high temperatures (e.g. above 750° C.); providing for a certain small concentration of sulphur compounds to be present in the feedstock (e.g. 10 p.p.m.); adding steam to the reactants (e.g. 10 percent by volume of the inlet gas); using a sufficiently high proportion of hydrogen to hydrocarbons (e.g. 300 cu. ft. per gallon); and operating at an adequate total pressure (e.g. above 10 atmospheres) and partial pressure of hydrogen. It has been found that with suitable employment of such precautions the gas recycle hydrogenator can be continuously operated for the hydrogenation of non-distillate oils (for example, light crude petroleum) for an economically useful time before carbon deposition interferes with the flow pattern of the reacting gases and vapours sufficiently to compel the plant to be shut down. The point at which it is necessary to interrupt the process can be judged from the maximum temperature difference between different points in the reactor; in general it is necessary to interrupt the process when this temperature difference is greater than 50° C., and it is preferred to interrupt the process when the difference is in the range 25 to 50° C.

It has furthermore been found that the carbon collects on the walls of the reactor (when a non-distillate oil is used) in such a way that it can readily be removed, and it is a feature of the invention that the process produces a small recoverable yield of carbon black. Other suitable means of recovery of the carbon black may be used; for instance, it may be washed out with jets of water (suitably placed inlets and outlets being provided) if it is desired to avoid dismantling the reactor between periods of operation.

The following example illustrates the process of the invention.

Algerian (Hassi Messaoud) crude petroleum was hydrogenated in a gas recycle hydrogenator in which the reaction chamber was 18 ft. long and 11.9 ins. diameter and contained an inner tube (15 ft. long and 7.9 ins. diameter) symmetrically disposed in relation to the ends of the chamber. The atomiser was at the base of the reactor and the whole of the hydrogenating gas was supplied to it to assist dispersal of the oil.

The nature of the feedstock and the supply rates were—

| | |
|---|---|
| Feedstock: | |
| Specific gravity (60°/60° F.) | 0.81 |
| Conradson carbon, percent by weight | 0.8 |
| Sulphur content, percent by weight | 0.1 |
| Average rates of supply: | |
| Oil, lbs. per hour | 715 |
| Hydrogenating gas, s.c.f. per hour | 28,200 |
| Steam, lb. per hour | 66 |

The following observations were made during a typical 2½ hour period during the test:

| | |
|---|---|
| Oil preheat temperature, ° C. | 361 |
| Hydrogen preheat temperature, ° C. | 614 |
| Reactor temperature, ° C. | 744 |
| Reactor pressure, p.s.i.g. | 750 |

Compositions of gases, percent by volume:

| | Hydrogenating gas | Product gas |
|---|---|---|
| $CO_2$ | 0.3 | 0.4 |
| Unsaturated hydrocarbons, $C_xH_y$ | 0.0 | 1.0 |
| CO | 2.6 | 1.9 |
| $H_2$ | 91.1 | 52.9 |
| $CH_4$ | 4.7 | 26.8 |
| $C_2H_6$ | 0.0 | 15.9 |
| $N_2$ | 1.3 | 1.1 |
| | 100.0 | 100.0 |

Calorific value of product gas, B.t.u./cu. ft.:

| | |
|---|---|
| As made | 735 |
| Inert-free | 745 |

Yield of aromatic hydrocarbon condensate, lb. per 1000 cu. ft. of product gas:

| | |
|---|---|
| Total | 4.47 |
| Containing: | |
| Benzene | 2.576 |
| Naphthalene | 0.521 |

Operation continued satisfactorily for 30 hours, at the end of which time the maximum temperature difference between points in the reactor had risen from the initial value of 15° C. to 35° C. This was an indication that recirculation was beginning to be impaired and the run was terminated. When the reactor was opened the surfaces were found to be uniformly covered with a layer of carbon black approximately ¼ inch thick. 26½ lbs. of carbon black were recovered.

As compared to the use of a fluidised bed hydrogenator, the process using the gas recycle hydrogenator described in the above example has many advantages. The apparatus used is easier to operate and is of a much simplified design; a distributor for a fluidised bed is not required and no provision need be made for carry-over or for feeding solids and withdawing them, and there is no danger of erosion. Start-up and shut-down is quicker, and the carbon formed can be easily recovered.

We claim:

1. A process for the production of a gas containing gaseous hydrocarbons by the hydrogenation of a non-distillate hydrocarbon oil, which process comprises (a) preheating the oil in the liquid phase, (b) atomising the preheated oil into a gas recycle hydrogenator in which the oil reacts under pressure with and is continuously entrained into circulation within the hydrogenator with a supply of hydrogenating gas, whereby the oil reacts with hydrogen to form gaseous hydrocarbons, and (c) continuously withdrawing a gas containing the gaseous hydrocarbons from the gas recycle hydrogenator.

2. A process as claimed in claim 1 wherein the oil is selected from the group consisting of crude petroleum and light crude petroleum having a density of less than 0.9 and a Conradson carbon content of less than 2% by weight.

3. A process as claimed in claim 1 wherein the oil is atomised by use of an atomiser comprising a central tube terminating in a nozzle for the supply of oil, surrounded by a co-axial tube terminating in a nozzle a short distance beyond the oil nozzle, for the supply of an atomising gas; and the hydrogenating gas is used as the atomising gas.

4. A process as claimed in claim 1 wherein the oil is preheated to as high a temperature as is consistent with avoiding pyrolysis of the oil.

5. A process as claimed in claim 1 wherein the hydrogenating gas is heated to a temperature such that the total sensible heat of the reactants is capable, in conjunction with the exothermicity of the reactions, of sustaining the operation of the hydrogenator in a thermally self-supporting manner.

6. A process as claimed in claim 1 wherein 2 to 5% by volume of the total volume of the hydrogenating gas is introduced into the oil before it is preheated.

7. A process as claimed in claim 1 wherein the reaction temperature is from 650° to 850° C. and the pressure is 5 to 100 atmospheres.

8. A process as claimed in claim 7 wherein the reaction temperature is from 700° C. to 800° C. and the pressure is 25 to 50 atmospheres.

9. A process as claimed in claim 1 which process is operated continuously, precautions being taken to limit or prevent carbon deposition.

References Cited

The following references, cited by the Examiner, are of record in the patented file of this patent or the original patent.

UNITED STATES PATENTS

| | | | |
|---|---|---|---|
| 3,363,024 | 1/1968 | Majumdar et al. | 48—213 X |
| 3,484,219 | 12/1969 | Dent et al. | 48—213 X |

JOSEPH SCOVRONEK, Primary Examiner

R. E. SERWIN, Assistant Examiner

U.S. Cl. X.R.

48—102; 252—373